United States Patent [19]

Kempf et al.

[11] 4,078,853
[45] Mar. 14, 1978

[54] OPTICAL COMMUNICATION CABLE

[75] Inventors: Raymond Andrew Kempf, Dunwoody; Manuel Roberto Santana, Doraville; Morton I. Schwartz, Atlanta, all of Ga.

[73] Assignee: Bell Telephone Laboratories, Incorporated, Murray Hill, N.J.

[21] Appl. No.: 661,389

[22] Filed: Feb. 25, 1976

[51] Int. Cl.² .............................................. G02B 5/14
[52] U.S. Cl. ............................... 350/96.23; 350/96.24
[58] Field of Search .............. 350/96 B, 96 R, 96 WG

[56] References Cited

U.S. PATENT DOCUMENTS

| | | | |
|---|---|---|---|
| 3,798,099 | 3/1974 | Marcatili | 156/158 |
| 3,865,466 | 2/1975 | Slaughter | 350/96 B |
| 3,883,218 | 5/1975 | Slaughter | 350/96 B |
| 3,887,265 | 6/1975 | Margolis et al. | 350/96 B |
| 3,937,559 | 2/1976 | Ferrentino et al. | 350/96 B |
| 3,955,878 | 5/1976 | Nowak | 350/96 B |
| 4,000,936 | 1/1977 | Gloge | 350/96 B |

OTHER PUBLICATIONS

Gardner "Microbending Loss in Optical Fibers" Bell System Tech. Journ. vol. 54, No. 2, Feb. 1975, pp. 457–465.

"Optical Fiber Cabling and Splicing" by Schwartz, Optical Fiber Transmission, Jan. 75, pp. WA2-1-4.

*Primary Examiner*—Paul A. Sacher
*Assistant Examiner*—Stewart Ley
*Attorney, Agent, or Firm*—Charles E. Graves; Edwin B. Cave

[57] ABSTRACT

An optical communication cable comprises one or more cores of light-transmitting optical fibers substantially decoupled mechanically from the rest of the cable structure. Surrounding each core is an inner jacket which forms a loose-fittng enveloping structure about the core. Surrounding the inner jacket or plurality of inner jackets is an outer jacket which is reinforced with primary strength members to carry expected tensile loads and to thereby relieve the fibers of the core or cores as cable strength members. The core fibers are also buckled into a slackened state under no-load conditions to allow for stress-free elongation of the core fibers during tensile pulling of the cable. In one embodiment, each core comprises linear arrays of optical fibers packaged in a plurality of ribbon structures which are stacked and helically stranded for further strain-relief. The arrays are specifically configured to permit mass cable splicing.

17 Claims, 6 Drawing Figures

OPTICAL COMMUNICATION CABLE

BACKGROUND OF THE INVENTION

This invention relates to optical fibers, and more particularly to transmission media comprising optical fibers.

Large bandwidth transmission and small size are well-recognized advatages of optical fibers as transmission media. These characteristics make optical fibers a desirable replacement for wire cables especially in congested areas where increased transmission is needed, but where additional space in cable ducts is not available.

One problem confronting the practical implementation of optical fibers, especially where the optical transmitting medium is to be drawn through ducts and thereby subjected to longitudinal and transversal mechanical loads, is that optical fibers are made of very delicate material, i.e. typically fused silica or other glasses. Glass fibers, though desirable for their optical transmitting properties, have less desirable mechanical characteristics as a transmitting medium. While the tensile strength of glass fibers is theoretically very high, their actual tensile strength (typically $2.1 \times 10^6 g/cm^2$ in kilometer lengths) is considerably lower and varies under field conditions. Also glass fibers are subject to static fatigue; that is, in the presence of moisture, glass will fracture under sustained stresses below the instantaneous tensile strength because of growth of surface flaws. Furthermore, glass fibers in very long lengths exhibit a low strain at break, usually less than half of one percent elongation before fracture. These characteristics present serious problems which must be overcome if optical fibers are to be implemented in future optical communication systems. It is likely that many signal channels will be allocated to each fiber in the future which means a fracture in one fiber would mean total communication loss of the channels transmitted in that fiber.

Another aspect is that even when an optical fiber does not fracture under the externally applied stresses, sufficient amplitude in a critical wavelength range may be present in random bends of the fiber axis to result in optical transmission loss. See W. B. Gardner's "Microbending Loss in Optical Fibers," *The Bell System Technical Journal*, Vol. 54, No. 2, February 1975, pp. 457–465 for a discussion of this phenomenon. This phenomenon can considerably degrade the transmission performance of the fibers, especially over long distances.

Therefore, it is desirable to design an optical communication cable which renders optical fibers a practical transmitting medium. It is especially desirable that the cable be capable of withstanding the tensile forces expected during installation as well as being sufficiently small cross-sectionally to minimize the space occupied in the ducts.

While achieving the foregoing however, it is also necessary to arrange the several fibers in each core in a geometry that facilitates fast, easy, reliable, and low loss splicing of one core to another, or of one portion of one core to a mating portion of another core.

Therefore, one object of the present invention is an optical communication cable which renders optical fibers a reliable yet economically feasible transmitting medium. A second inventive object is to minimize the chances of strain on the fibers under expected loading conditions. A third inventive object is to minimize random bending loss in the fibers. A fourth inventive object is to configure an optical communication cable in such a way as to facilitate mass splicing.

SUMMARY OF THE INVENTION

Pursuant to this invention, the foregoing objectives and others are achieved by structurally isolating light-transmitting optical fibers from the surrounding loading environment. Accordingly, in one embodiment of the present inventive optical communication cable, a plurality of light-transmitting optical fibers, forming a cable core, are contained in a loose-fitting enveloping structure so that the core fibers are substantially longitudinally decoupled from the rest of the cable structure, i.e., highly impervious to longitudinal strain due to any longitudinal tensile forces applied to the adjacent cable structure. This structural isolation also advantageously minimizes radial impact of loads on the core fibers. Other enveloping structures for containing the core can be envisioned.

Surrounding the enveloping structure or inner jacket is an outer jacket which is reinforced with primary strength members characterized by a tensile modulus and a strain at break greater than that of the glass optical fibers. The primary strength members are tightly coupled to the outer jacket so that they will carry the expected loads. Hence, under expected loading conditions, the externally applied tensile stresses are substantially taken up by the primary strength members and not passed on to the core fibers.

As the greatest load experienced by an optical communication cable is expected during tensile pulling of the cable into a duct, the cable is advantageously designed to withstand tensile loads greater than $9.07 \times 10^4$ g. Without breaking any light-transmitting optical fibers. The cable is particularly well suited for use with conventional pulling apparatus, one example being Kellems grips which grip the cable from the outer surface of the cable. The cable construction includes jackets of high-modulus material, which supply resistance to both the radial crushing forces of a pulling grip at the cable end and radial crushing or impact loads that may occur throughout the cable length. Advantageously, not only are the optical fibers substantially decoupled from the remaining cable structure, the fibers are as physically removed from the load-generating grips as possible.

In one embodiment, the primary strength members are tightly coupled to the outer jacket near the outer periphery of the cable to carry the externally applied loads.

The optical fibers are also advantageously buckled into a slackened state under no-load conditions pursuant to this invention. As a result, during tensile elongation of the cable, the slack of the core fibers must be taken up before any load-bearing strain is experienced by them. However, before the slack is taken up, the primary strength members will have taken on the load to relieve the core fibers as cable strength members.

It is a feature of this invention that the loosetube cable structure is highly amenable to mass splicing. Thus, in a highly advantageous embodiment, linear arrays of optical fibers, in the form of optical fiber ribbons, are stacked and helically twisted in the core. The stacking core arrangement creates a regular x-y matrix of optical fibers which is advantageously amenable to the application of cable connectors that can result in splice joints no larger than the cable cross-section. The surrounding enveloping structure, while mechanically isolating the core fibers from externally applied loads, maintains the stacking core arrangement throughout the cable length to ease splicing operations at any cable point. Also, because no buildup of the cable's diameter need occur at the splice point, the inventive cable can be connectorized in the factory prior to cable installation. This can greatly facilitate field splicing operations in that a single cable joining operation in the field can effectively splice the entire x-y matrix of optical fibers without handling of individual fibers.

The invention and its further objects, features and advantages will be readily discerned from a reading of the description to follow of illustrative embodiments.

DETAILED DESCRIPTION OF ILLUSTRATIVE EMBODIMENTS

Figure 1:
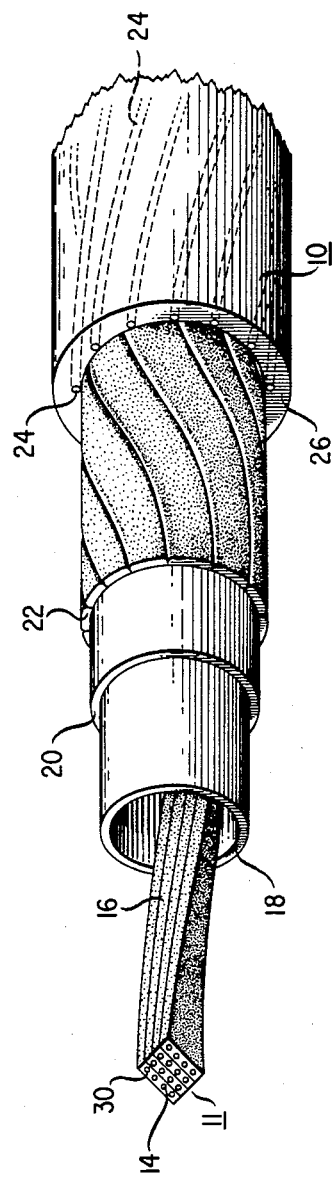
FIG. 1 is a fragmented perspective view of an optical communication cable constructed in accordance with this invention.

Depicted in FIG. 1 of the drawing is a fragmented perspective view of one embodiment of the optical communication cable 10 constructed in accordance with this invention. Forming a core 16 of cable 10 are a plurality of light-transmitting optical fibers 14 advantageously packaged in assemblies commonly known as optical fiber ribbons 30, each of which comprises a linear array of optical fibers held in a uniformly spaced, parallel relation by some suitable flexible protective structure. The planar geometry and the uniform center-to-center spacing of the fibers 14 in these ribbons advantageously facilitate gang-splicing without individual fiber handling.

Ribbons 30 are loosely arranged in a stack 11. Advantageously, the stacked geometry creates a core cross-section in which the core optical fibers 14 are dispersed in a regular x-y matrix with a substantially uniform center-to-center spacing in both the x and y directions, which is desirable for mass splicing.

The stack 11 is helically twisted to provide strain relief when bent. In an illustrative embodiment, a 15.24-cm twisting lay has been used for a stack 11 of twelve ribbons. Each ribbon, having a 0.36 cm $\times$ 0.03 cm cross-section, comprises twelve 0.023 cm diameter optical fibers. The twisting lay of stack 11 is selected to provide sufficient strain relief without overstressing fibers 14 through too much twisting.

Surrounding core 16 is an inner jacket 20 which forms the enveloping structure for loosely containing the fiber ribbons 30. Advantageously allowed to move about freely in inner jacket 20, ribbons 30, as well as fibers 14, are substantially decoupled from the rest of the cable structure as taught by this invention. The fit is quite loose. For a square stack 11 of ribbons 30, it is preferred that the ratio of the interior cross-sectional area of the inner jacket 20 to the cross-sectional area of ribbon stack 11 be in the range of 2.0–2.5. The ratio is chosen, on the one hand, to maximize mechanical decoupling, and on the other hand, to minimize the overall cable dimension. Another consideration is that the inner diameter of inner jacket 20 be selected to maintain the designed core configuration throughout the cable length for splicing.

Inner jacket 20 is advantageously made of a relatively stiff material capable of mechanically protecting core ribbons 30 against externally applied compressive and impact loads, while at the same time being sufficiently resilient to bend during reeling or installation. A high-modulus material having an elastic modulus of at least $7.03 \times 10^6$ g/cm$^2$ is preferable to minimize the inner jacket thickness needed to provide impact protection; one such suitable material is high-density polyethylene (HDPE) with a modulus range of $7.03 \times 10_6 - 1.05 \times 10^7$ g/cm$^2$. As the core cross-sectional dimension increases, an inner jacket of higher modulus is desired to minimize the inner jacket thickness and hence the resulting cross-sectional dimension of the optical communication cable.

In the illustrative embodiment, inner jacket 20 is advantageously lined along its interior surface with a first layer 18 of thermally insulative material that protects core 16 from heat generated during the manufacture of inner jacket 20. Too much heating of core 16 may affect the fibers 14 and/or ribbons 30. Depending on the degree of heating, optical loss or fiber breakage can result. A safe maximum core temperature of 66 degrees C is preferred. In the illustrative embodiment, a longitudinally applied paper layer has been found quite suitable as an insulation.

Surrounding inner jacket 20 is an outer jacket 26 reinforced with primary strength members 24. Desirably, the primary strength members 24 are as physically removed from the light-transmitting fibers 14 as possible and as close to the actually applied tensile load as possible. Outer jacket 26, also preferably made of a high-modulus material as is inner jacket 20, is advantageously a layer of high-density polyethylene.

In accordance with this invention, primary strength members 24 are tightly coupled to outer jacket 26 so that together they act as a composite structure. To achieve the tight coupling, outer jacket 26 is advantageously formed by pressure extrusion in a process which concurrently embeds the strength members 24 substantially within outer jacket 26. Hence, if the cable 10 is loaded in tension, the strength members 24 begin to carry the load before any significant elongation of outer jacket 26 has occurred.

Primary strength members 24 are characterized by a high tensile modulus and a strain at break greater than that of the glass optical fibers. The high tensile modulus is desired to minimize the amount of material needed to provide reinforcing strength, hence reducing the size of the resulting optical communication cable 10. The greater strain at break ratio assures that the reinforcing material does not break before the glass fibers. One suitable material having the desirable characteristics is steel.

However, in the illustrative embodiment, the primary strength members 24 are advantageously made of graphite yarns, such as disclosed in U.S. patent application Ser. No. 553,503, filed Feb. 27, 1975 and assigned to the assignee of the present application. These graphite yarns have a typical tensile modulus in the described embodiment of $1.27 \times 10^9$ g/cm$^2$ (compared to a typical $7.03 \times 10^8$ g/cm$^2$ for glass fibers) and a greater strain at break than glass fibers. Desirably, graphite yarns are also flexible (being of a filament structure), very light for their strength, and nonmetallic, as compared to steel. The nonmetallic characteristic of the yarns is especially advantageous. In the illustrative embodiment, all of the structural materials are nonmetallic, hence, eliminating the need for grounding continuity or protection in the resulting optical communication cable. It is sometimes advantageous to impregnate the graphite yarns with a polymer such as ethylene acrylic acid copolymer to increase both their handleability and their shear strength.

In the illustrative embodiment, a plurality of graphite yarns are embedded in regular intervals in outer jacket 26. The number of graphite yarns selected is sufficient to carry the maximum anticipated tensile load. While graphite yarns 24 are helically stranded in cable 10, the lay length is sufficiently large so that the strength members 24 are essentially longitudinally coupled with outer jacket 26. Some lay is desirable to facilitate bending of the cable during manufacture and installation. Yet, when cable 10 is elongated under tensile loading, radial contraction of cable 10 due to graphite yarns 24 is minimized. A maximum stranding lay angle of 7 degrees for the strength members 24 is preferred.

Completely separating inner jacket 20 and outer jacket 26 is a second layer 22 which thermally insulates the inner cable layers against heat generated during pressure extrusion of outer jacket 26.

As will be discussed later, it is desirable that outer jacket 26 does not shrink more than 0.2 percent during its manufacture. The inner jacket 20 advantageously opposes outer jacket shrinkage to control and reduce the amount the outer jacket 26 shrinks. Occasionally, second layer 22 may be desirable as a thermal barrier to prevent thermally induced shrinkage of inner jacket 20 during outer jacket manufacture. This can advantageously aid inner jacket 20 in opposing outer jacket 26 shrinkage. In the illustrative embodiment, polypropylene twine has been found quite suitable and sufficient to maintain inner jacket 20 at a temperature below 60 degrees C, which is considered a maximum safe non-shrinking temperature for an inner jacket 20 of HDPE.

Second layer 22 may occasionally be of a material to cushion impact loads which would otherwise pass on to the inner cable layers during tensile loading. In the preferred embodiment, polypropylene twine is advantageously fluffed or fibrillated to allow for substantial radial compliance, i.e., greater cushionability.

Figure 2:
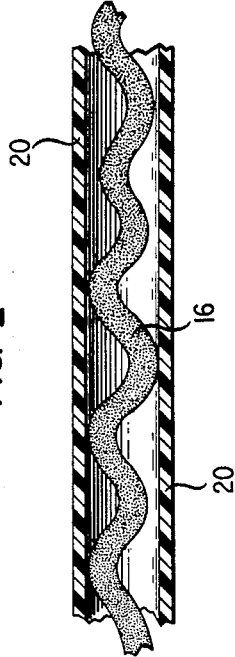
FIG. 2 illustrates schematically the buckling of the core fibers under no-load conditions in sectional view.

One inventive aspect of the present invention is the buckling of core ribbons 30 or fibers 14 into a slackened state under no-load conditions. As illustrated in FIG. 2 in exaggerated detail, the slackened core 16 describes an undulating path with respect to the relatively straight inner jacket 20. Preferably, this buckling provides a strain relief up to approximately 0.2 percent. This buckling advantageously permits core ribbons 30 to elongate without bearing any of the applied tensile loads until the slack is taken up. However, before the core slack is taken up completely, the graphite yarns 24 begin to carry the loads since they are not buckled as much as the core ribbons 30 as will be explained later, hence relieving optical fibers 14 as cable strength members.

This inventive aspect is achieved during the pressure extrusion process of outer jacket 26 onto the remaining cable structure. Even though cable core 16 is substantially decoupled from the rest of cable 10, over a longitudinal length, coupling between core 16 and other layers does occur as a result of such factors as frictional forces due to the weights of the various cable components.

After pressure extrusion of outer jacket 26, the cooling of outer jacket 26 results in a shrinkage preferably of a maximum of 0.2 percent; much greater shrinkage can cause fiber breakage. The compressive forces due to shrinkage of outer jacket 26 causes inner jacket 20 to contract longitudinally the same extent; in turn, inner jacket 20 causes the core ribbons 30 to buckle into a slackened state. The inner surface of inner jacket 20 advantageously controls and causes buckling regularity of core ribbons 30 so that they are not broken by over buckling. The shrinkage of outer jacket 26 also causes some compression and buckling of the embedded primary strength members 24.

Advantageously, the graphite yarns 24 do not buckle as much as the core ribbons 30, as mentioned earlier. The core ribbons 30 respond to the compressive forces due to outer jacket shrinkage by buckling. However, the graphite yarns 24, embedded in outer jacket 26, are essentially restrained in their lateral movement unlike the loosely contained ribbons 30 in core 16. Thus, the yarns 24 can buckle only partially in response to the compressive forces of outer jacket 26 and must take the remaining load in compression. As a result of less buckling and hence, less slack under no-load conditions, the graphite yarns 24 begin to take on the applied tensile loads before the slack of the core ribbons 30 is taken up by tensile elongation.

Figure 3:
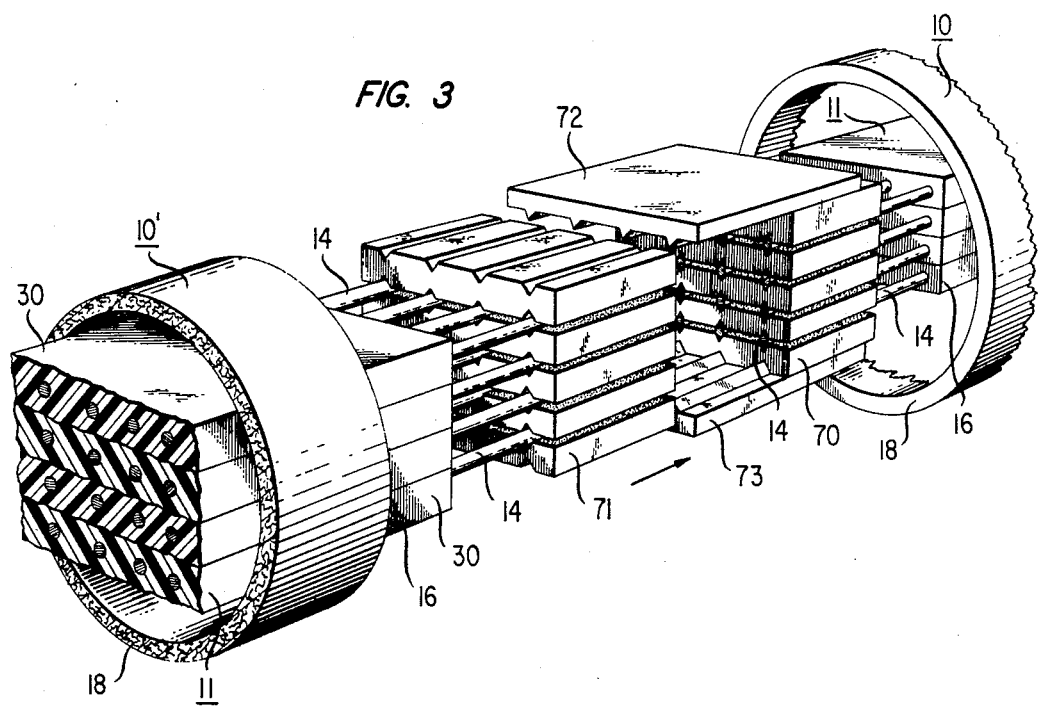
FIG. 3 is a perspective view showing two connectorized cable cores of FIG. 1 being joined.

As mentioned earlier, the inventive optical communication cable taught by this disclosure is advantageously configured for mass splicing. For example, the cable embodiment depicted in FIG. 1 is suitable for splicing an entire cable of optical fibers with a single resulting splice joint no larger than the cable cross-section. Shown in FIG. 3 is a connectorized cable core 16 of a first FIG. 1 cable 10 being joined to a second such cable 10'; the cable cores 16 are shown enlarged for convenience of illustration, but in practice are always decoupled from the surrounding cable enveloping structures, of which only layers 18 are illustrated. The cables are spliced when the butt joint connectors 70 and 71, which hold the arrays of optical fibers 14, are abutted and joined, the reverse ridge fixtures 72 and 73 guide the connectors 71 and 70 into axial alignment with each other. Each butt joint connector, 70 or 71, achieves a cross-sectional core end configuration in which the optical fibers 14 are dispersed in a x-y matrix with a uniform center-to-center spacing in both the x and y directions. The application of such connectors is feasible because of the cable core ribbon geometry chosen. The illustrated connectors and splicing technique are disclosed in U.S. Pat. No. 3,864,018, issued Feb. 4, 1975, which is assigned to the assignee of the present invention; other splicing techniques and apparatus taught in the art may be used.

Figure 4:
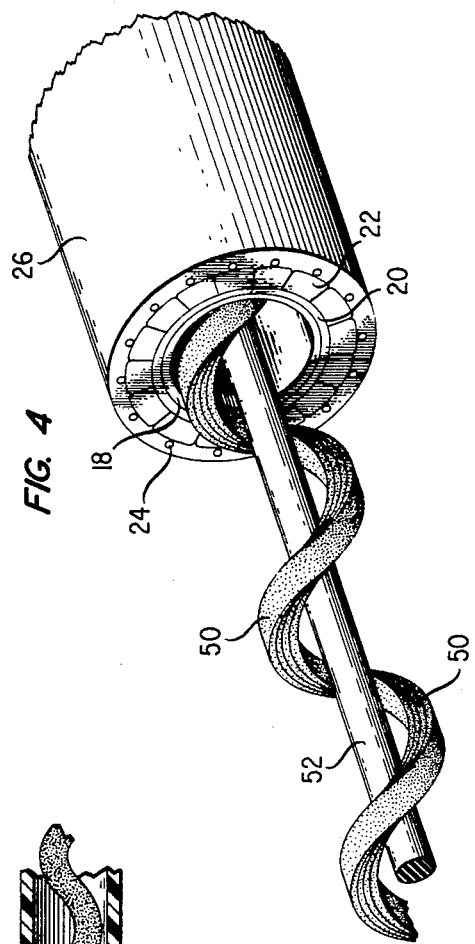
FIG. 4 is a fragmented perspective view of a further embodiment of the inventive optical communication cable.

Other configurations for cable 10 can also be readily envisioned. In one embodiment, as illustrated in FIG. 4, ribbons 30 are arranged in a stack 50 and helically stranded about a compliant center member 52 in core 16 to provide additional strain relief; the ribbon stack 50 acts as a spring. The amount of stranding of stack 50 about compliant member 52 depends on the size of the stack 50, the size of fibers 14, and the size of compliant member 52.

Figure 5:
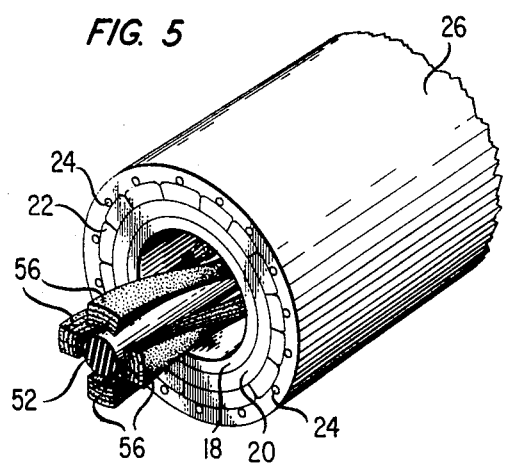
FIG. 5 shows another embodiment of the inventive optical communication cable in fragmented perspective view.

In an alternative embodiment, a plurality of smaller ribbon stacks 56 are helically twisted about compliant center member 52 in core 16, as illustrated in FIG. 5. A more flexible strain relief arrangement results as greater axial movement of the stacks 56 are allowed. Also, this embodiment comprising a plurality of stacks 56 advantageously permits greater flexibility in mass splicing. For example, in FIG. 3, each fiber 14 in the first FIG. 1 cable is spliced to a predetermined fiber 14 in the second FIG. 1 cable so that if any fibers are broken, no rearrangement can be effected to mate broken fibers. As an alternative, the FIG. 5 embodiment, by utilizing a different connector for each stack, allows partially rearrangeable splice connections, i.e., stacked arrays which contain broken fibers can be spliced together and stacked arrays which have no broken fibers can be spliced to other arrays with no broken fibers.

Figure 6:
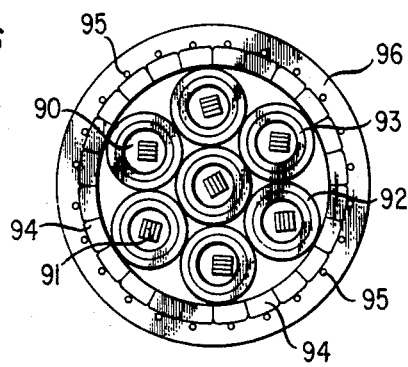
FIG. 6 is a cross-sectional view of a further embodiment of the inventive optical communication cable.

Another embodiment of the inventive optical communication cable is the multicore cable illustrated in FIG. 6. Similar to core configuration 16 in the FIG. 1 embodiment, each core 90 comprises a plurality of optical fibers 14 arranged in a ribbon stack 91. Surrounding each core 90 is a loose-fitting enveloping structure or inner jacket 92, which is advantageously made of HDPE and lined along its interior surface with a first insulating layer 93 of paper. In the illustrated embodiment, six of the loose-fitting tubular structures are helically stranded about a seventh such loose-fitting tubular structure. Surrounding the plurality of loose-fitting tubular structures 92 is a second layer of insulation 94 and then an outer jacket 96 of HDPE reinforced with primary strength members 95. This embodiment advantageously permits partially rearrangeable splice connections; also each stack 91 is maintained in a regular matrix by the corresponding inner jacket 92 throughout the cable length, which is desirable for mass splicing.

While certain illustrative embodiments of the invention have been shown and described, it should be apparent that various modifications could be made therein without departing from the scope of the invention.

What is claimed is:

1. An optical communication cable comprising:
at least one core, said core comprising:
  a compliant center member;
  a plurality of optical fibers packaged in units of optical fiber ribbons, said ribbons being arranged in at least one stack, said stack being helically stranded about said center member;
an inner jacket surrounding said core, said inner jacket forming a loose-fitting enveloping structure sufficiently loose with respect to said core such that said core is substantially decoupled from said inner jacket;
an outer jacket surrounding said inner jacket; and
a plurality of primary strength members tightly coupled to said outer jacket to carry applied tensile loads.

2. An optical communication cable comprising:
at least one core, said core comprising a plurality of optical fibers being packaged in the form of optical ribbons, said ribbons being arranged in a stack and helically twisted in said core;
a first layer of insulative material for thermally protecting said core;
an inner jacket for forming a loose-fitting enveloping structure surrounding said core, whereby said inner jacket is being sufficiently loose with respect to said core such that said core is substantially decoupled from said inner jacket, and whereby said first layer is lined along the interior surface of said inner jacket;
a second layer of insulative material surrounding said inner jacket, for preventing thermally induced shrinkage of said inner jacket;
an outer jacket surrounding said second layer of insulative material; and
a plurality of primary strength members tightly coupled to said outer jacket to carry applied tensile loads,
wherein said core describes an undulating path with respect to the relatively straight inner jacket in which said core is contained.

3. An optical communication cable comprising:
at least one core, said core comprising a plurality of optical fibers being packaged in units of optical fiber ribbons, said ribbons being arranged in at least one stack and helically twisted in said core, wherein said fibers are arranged with a uniform center-to-center spacing in each said ribbon, and wherein the optical fibers at any cross-section of said core are dispersed in an x-y matrix with a substantially uniform center-to-center spacing in both the x and y directions, thereby permitting mass cable splicing;
an inner jacket surrounding said core, said inner jacket forming a loose-fitting enveloping structure sufficiently loose with respect to said core such that said core is substantially decoupled from said inner jacket;
an outer jacket surrounding said inner jacket; and
a plurality of primary strength members tightly coupled to said outer jacket to carry applied tensile loads.

4. An optical communication cable comprising:
at least one core, said core comprising a plurality of optical fibers being packaged in units of optical fiber ribbons wherein said ribbons are arranged in at least one stack and helically twisted in said core;
an inner jacket surrounding said core, said inner jacket forming a loose-fitting enveloping structure sufficiently loose with respect to said core such that said core is substantially decoupled from said inner jacket;
an outer jacket surrounding said inner jacket;
a plurality of primary strength members tightly coupled to said outer jacket to carry applied tensile loads; and
means for achieving a cross-sectional core end configuration in which the optical fibers are dispersed in a x-y matrix with a uniform center-to-center spacing in both the x and y directions.

5. An optical communication cable comprising:
at least one core comprising a plurality of optical fibers, said fibers being packaged in the form of optical ribbons;
an inner cable jacket surrounding said core, said inner cable jacket forming a loose-fitting enveloping structure sufficiently loose with respect to said core such that said core is substantially mechanically decoupled from said inner cable jacket;
an outer cable jacket surrounding said inner cable jacket; and
a plurality of primary strength members tightly coupled to said outer cable jacket to carry applied tensile loads, wherein said ribbons describe undulating paths with respect to the relatively straight inner cable jacket in which they are loosely contained.

6. An optical communication cable comprising:

at least one core, said core comprising a plurality of optical fibers being packaged in units of optical fiber ribbons, said ribbons being arranged in at least one stack and helically twisted in said core;

an inner jacket surrounding said core, said inner jacket forming a loose-fitting enveloping structure sufficiently loose with respect to said core such that said core is substantially decoupled from said inner jacket;

an outer jacket surrounding said inner jacket;

a plurality of primary strength members tightly coupled to said outer jacket to carry applied tensile loads; and a layer of insulative material between said inner jacket and outer jacket, said layer having substantial thermal insulative properties to prevent shrinkage of said inner jacket during manufacture of said outer jacket.

7. An optical communication cable as claimed in claim 6 wherein said fibers are arranged with a uniform center-to-center spacing in each said ribbon to facilitate mass splicing.

8. An optical communication cable comprising:

at least one core comprising a plurality of optical fibers;

an inner jacket surrounding said core, said inner jacket forming a loose-fitting enveloping structure sufficiently loose with respect to said core such that said core is substantially decoupled from said inner jacket;

an outer jacket surrounding said inner jacket;

a plurality of primary strength members tightly coupled to said outer jacket to carry applied tensile loads; and a layer of insulative material between said inner jacket and outer jacket, said layer having substantial thermal insulative properties to prevent shrinkage of said inner jacket during manufacture of said outer jacket.

9. An optical communication cable as claimed in claim 8 wherein said inner jacket is formed of a material having an elastic modulus of at least $7.03 \times 10^6$ g/cm$^2$.

10. An optical communication cable as claimed in claim 8, said cable further comprising:

a first layer of material between said core and inner jacket having substantial thermal insulative properties.

11. An optical communication cable as claimed in claim 8 wherein said outer jacket is formed of a material having an elastic modulus of at least $7.03 \times 10^6$ g/cm$^2$.

12. An optical communication cable as claimed in claim 8 wherein said second layer is further characterized by substantial radial compliance for reducing impact loads on said inner jacket.

13. An optical communication cable as claimed in claim 12 wherein said layer of insulative material is formed of polypropylene twine.

14. An optical communication cable as claimed in claim 8 wherein said core describes an undulating path with respect to the relatively straight inner jacket in which said core is contained.

15. An optical communication cable as claimed in claim 14 wherein the extent of core slack due to said undulation is at most 0.2 percent.

16. An optical communication cable as claimed in claim 15 wherein said primary strength members have a tensile modulus greater than $7.03 \times 10^8$ g/cm$^2$ and have an elongation at break greater than that of optical fibers.

17. An optical communication cable as claimed in claim 16 wherein said primary strength members are nonmetallic.

* * * * *